United States Patent [19]
Gstöhl et al.

[11] 3,757,080
[45] Sept. 4, 1973

[54] CONTACT CLAMP FOR ELECTRIC WELDING APPARATUS

[75] Inventors: Norbert Gstöhl, Eschen; Dankmar Tauern, Triesenberg, both of Germany

[73] Assignee: Hilti Aktiengesellschaft, Schaan, Furstentum, Liechtenstein

[22] Filed: Dec. 14, 1971

[21] Appl. No.: 207,732

[30] Foreign Application Priority Data
Feb. 15, 1971 Germany............... P 21 07 116.9

[52] U.S. Cl.......................... 219/161, 339/264
[51] Int. Cl.......................... B21j 13/08
[58] Field of Search............. 219/136, 161; 339/95, 96, 263 L, 264

[56] References Cited
UNITED STATES PATENTS
| | | | |
|---|---|---|---|
| 2,420,895 | 5/1947 | Merriman | 339/264 |
| 1,810,901 | 6/1931 | Bormann et al. | 339/264 |
| 3,363,219 | 1/1968 | Hubbard et al. | 339/264 |

FOREIGN PATENTS OR APPLICATIONS
| | | | |
|---|---|---|---|
| 791,377 | 2/1958 | Great Britain | 219/161 |
| 1,085,499 | 10/1967 | Great Britain | 339/95 A |

*Primary Examiner*—J. V. Truhe
*Assistant Examiner*—B. A. Reynolds
*Attorney*—Toren & McGeady

[57] ABSTRACT

A contact clamp for use in electrical welding is formed of a pair of arms arranged to be clamped to a workpiece. At least one of the arms has a pointed projection or cutting edge formed on its surface which contacts the workpiece for cutting through poorly conductive or non-conductive layers and assuring a satisfactory electrical contact between the clamp and the workpiece. A separate tightening screw can be used, extending through the end surface of one of the arms into contact with the workpiece. The pointed projection or cutting edge can be formed on the end of the tightening screw which contacts the workpiece.

4 Claims, 5 Drawing Figures

PATENTED SEP 4 1973 3,757,080

INVENTORS
NORBERT GSTÖHL
DANKMAR TAUERN
BY
ATTORNEYS

CONTACT CLAMP FOR ELECTRIC WELDING APPARATUS

SUMMARY OF THE INVENTION

The invention is directed to electric welding apparatus and, more particularly, it concerns the configuration of the surface of a clamp for providing electrical contact with a workpiece.

Conventional clamps, used for effecting electrical contact in a welding apparatus, are usually constructed as a screw clamp and are attached to a workpiece by means of a screw mechanism. Further, it has also been known to use magnetic clamps for this purpose. The surface of the clamp in contact with the workpiece provides an electrically conductive connection, however, if the surface of the workpiece is rusty, soiled, painted or scaled, it is often difficult to provide a good conductive connection and, as a result, the quality of the welding is affected.

Therefore, the primary object of the present invention is to provide a clamp which assures a good electrical contact with a workpiece regardless of the condition of its surface.

In accordance with the present invention, the problem of assuring a good electrical contact is provided by forming pointed projections or a cutting edge on the surface of the clamp which contacts the workpiece. The pointed projections or cutting edge are formed so that they cut through any poorly conductive or non-conductive surface layer on the workpiece, leaving the clamp in direct contact with the workpiece.

By piercing through any surface layer on the workpiece not only is a satisfactory connection afforded, but, in addition, the mechanical attachment of the clamp to the workpiece is improved.

While a single pointed projection can afford the desired results, it is preferable to form a plurality of such pointed projections formed, for example, by a cross cutting the surface of the clamp which contacts the workpiece. As the clamp is tightened onto the workpiece, the pointed projections pierce through any surface layer which adversely affects the electrical contact and provides direct contact with the electrically conductive material of the workpiece.

In an alternate embodiment, one of the arms of the clamp can be provided with a separate tightening screw which extends through the arm into contact with the surface of the workpiece. The end surface of the screw which contacts the workpiece is provided with pointed projections or a cutting edge which cuts through any surface layer as the screw is tightened against the workpiece. In such an arrangement, the screw can be moved inwardly and outwardly through the arm clamp.

The end of the tightening screw which provides the contact with the workpiece can be provided with a relief-ground surface extending helically from a radially extending cutting edge. The relief-ground surface has a pitch which corresponds substantially to the pitch of the thread on the screw. As the tightening screw is threaded into engagement with the workpiece, any surface layer is removed by the cutting edge and the pitch of the end face of the screw is such that it cannot penetrate into the workpiece before the surface of the workpiece is sufficiently cleaned. After the tightening of the screw is completed, its helically shaped relief-ground surface is pressed against the cleaned surface of the workpiece and ensures a satisfactory electrical contact between the clamp and the workpiece.

To remove any chips formed by the cutting edge as it is tightened against the surface of the workpiece, a groove is formed on the end face of the screw extending along and ahead of the cutting edge in its direction of movement as it is threaded through the arm into contact with the workpiece.

As an alternative, the contacting surface on the end of the tightening screw can be shaped in the manner of a drill so that the pitch of its relief-ground end surface is substantially the same as the pitch of its threads. As in the above-mentioned arrangement of the tightening screw, any surface layer which blocks good electrical contact is removed by the cutting edge formed on the drill shaped end of the screw and the end surface is pressed against the cleaned workpiece surface. With the pitch of the threads and the pitch of the relief-ground end surface being substantially the same, the areal contact with the workpiece is improved.

To prevent premature wear of the contacting end surfaces of the clamp, the projecting points or cutting edge can be formed of a hard metal or of a hardenable material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
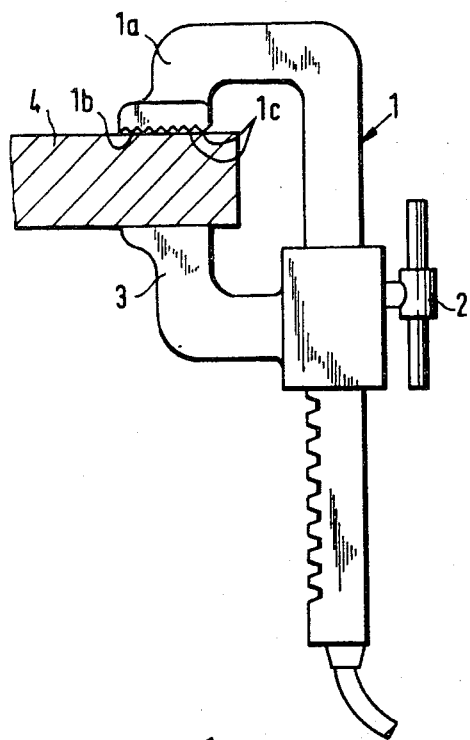
FIG. 1 is a side view of a clamp, formed in accordance with the present invention, attached to a workpiece, shown in section.
Figure 2:
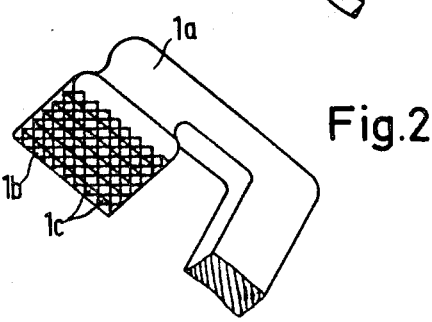
FIG. 2 is a partial perspective view of the clamp illustrated in FIG. 1.

As shown in the drawing, and in particular in FIGS. 1 and 2, a clamp 1 for an electrical welding apparatus is formed of a pair of arms 1 and 3 with a clamp screw 2 arranged to tighten the arms into contact with a workpiece 4. As illustrated in FIG. 1, the surface of arm 1a contacting the workpiece 4 has a cross-cut configuration providing a plurality of pointed projections 1c which provide point contact with the surface of the workpiece. When the arm 3 is displaced toward the arm 1a by means of the screw 2, the pointed projections 1c are forced through any surface layer on the workpiece into contact with its base material. Though the cross-cut 1b is shown on only one arm, it can be readily appreciated that the surface of both arms contacting the workpiece can be similarly configured. Alternatively, the cross-cut arrangement can be formed on a plate, preferably made of a hard or hardenable material, and secured to one or both of the arms 1a,3. The specific form of the cross-cut 1b is of minor significance, however, optimum results were achieved where the cross-cut was made to a depth of 1 to 2 mm and the angle of the pointed projections was at 60°.

Figure 3:
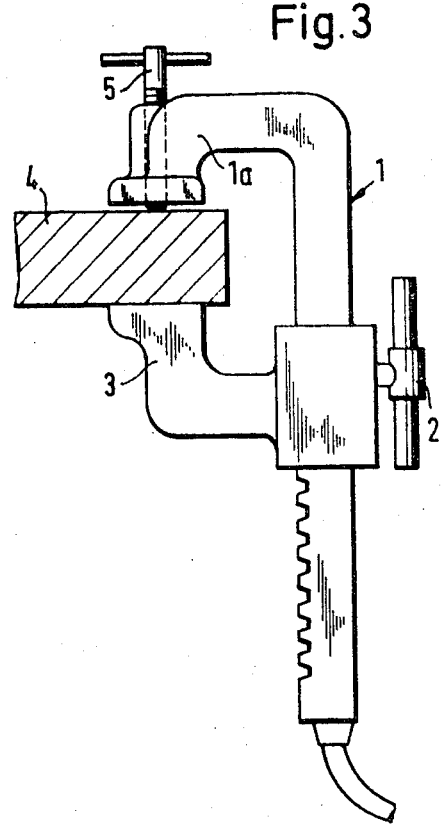
FIG. 3 is a view, similar to FIG. 1, of another embodiment of the present invention utilizing a separate tightening screw with the clamp.

In FIG. 3 a clamp 1 is shown, similar to that in FIG. 1, but with the addition of a separate tightening screw 5 which extends through the arm 1a with its end surface contacting the surface of the workpiece 4. Initially, the arm 3 is displaced toward the arm 1a for effecting a pre-tightening of the clamp on the workpiece, then the final clamping action is performed by the tightening screw 5 which affords the effective contact between the clamp and the workpiece.

Figure 5:
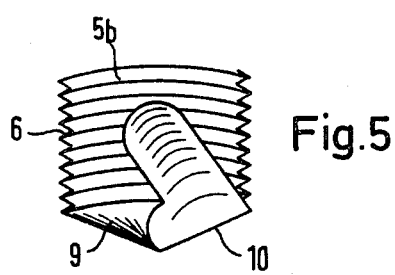
FIG. 5 is a perspective view of another embodiment of the tightening screw in FIG. 3.
Figure 4:
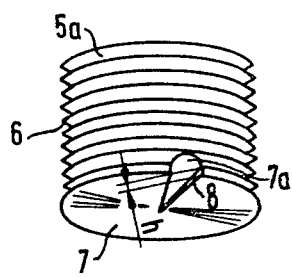
FIG. 4 is a perspective view of one embodiment of the tightening screw illustrated in FIG. 3.

Two different embodiments of the tightening screw 5 are shown in FIGS. 4 and 5, in FIG. 4 the side surface 5a of the screw 5 has a thread 6 which engages with a similar thread in the arm 1a. The end of the screw 5, which contacts the workpiece, has a helically shaped relief-ground surface 7 with a radially extending cutting edge 8 formed on the surface. Preferably, the pitch of the helically shaped surface 7 is substantially the same as the pitch of the thread 6. As the screw 5 is tightened onto the workpiece, any surface layer is scraped from the workpiece by the cutting edge and the relief-ground surface 7 trailing the cutting edge is forced into contact with the cleaned surface of the workpiece. Extending along and ahead of the cutting edge in its direction of movement when it is tightened onto the workpiece, is a groove 7a into which any material scraped from the surface of the workpiece is collected.

In FIG. 5 the side surface 5b of the screw has a thread 6 and its end surface which contacts the workpiece is shaped in the manner of a drill. To provide an area of contact with the workpiece, the pitch of the relief-ground surface 9 on the end of the screw is substantially the same as the pitch of the thread 6, while the other angles correspond to those of a metal drill. The drill-like configuration of the end of the screw 5 provides the cutting edge 10 which removes any surface layers on the workpiece as the screw is tightened into contact with it. As the cutting edge 10 cleans the surface, the relief-ground surface 9 following it is pressed against the cleaned workpiece surface and provides the desired electrical contact.

While specific embodiments of the invention have been shown and described in detail to illustrate the application of the inventive principles, it will be understood that the invention may be embodied otherwise without departing from such principles.

What is claimed is:

1. A clamp for use in an electrical welding apparatus for effecting electrical contact with a workpiece, said clamp including arm means providing electrical contact surfaces arranged to be clamped to the workpiece, wherein the improvement comprises at least one of said contacts surfaces having at least one punctiform portion arranged to pierce any material obstructing contact with the surface of the workpiece and to contact the surface of the workpiece, and a recess formed in said contact surface contiguous to said punctiform portion for receiving any material cleaned away from the surface of the workpiece by said punctiform portion, said arm means comprising a pair of arms, a screw extending through one of said arms and having an end surface arranged to contact the workpiece, said punctiform portion being formed on the end surface of said screw, said screw mounted in the one of said arms for movement therethrough toward and away from the workpiece, the side surface of said screw being threaded, said punctiform portion on the end surface of said screw, comprising one end of a radially extending cutting edge, the end surface extending helically from said cutting edge and the helically extending end surface having a pitch substantially corresponding to the pitch of the threaded side surface of said screw.

2. A clamp, as set forth in claim 1, wherein the end surface of said screw has a groove forming said recess and extending along said cutting edge and inwardly into said screw and positioned ahead of said cutting edge in the direction in which said screw is moved into contact with the workpiece.

3. A clamp for use in an electrical welding apparatus for effecting electrical contact with a workpiece, said clamp including arm means providing electrical contact surfaces arranged to be clamped to the workpiece, wherein the improvement comprises at least one of said contact surfaces having at least one punctiform portion arranged to pierce any material obstructing contact with the surface of the workpiece and to contact the surface of the workpiece, a recess formed in said contact surface contiguous to said punctiform portion for receiving any material cleaned from the surface of the workpiece by said punctiform portion, said arm means comprising a pair of arms, a screw extending through one of said arms and having an end surface arranged to contact the workpiece, said punctiform portion being formed on the end surface of said screw, said screw being mounted in the one of said arms for movement therethrough toward and away from the workpiece, the side surface of said screw being threaded, the end surface of said screw arranged to contact the workpiece has a relief-ground surface in the configuration of a drill and the pitch of said relief-ground surface is substantially the same as the pitch of the thread on the side surface of said screw.

4. A clamp, as set forth in claim 3, wherein said relief-ground surface on said screw forms a cutting edge.

* * * * *